United States Patent
Kuzmin et al.

(10) Patent No.: US 8,362,779 B2
(45) Date of Patent: *Jan. 29, 2013

(54) DOUBLE-SUSPENSION RECEIVER COIL SYSTEM AND APPARATUS

(75) Inventors: Petr Valentinovich Kuzmin, Aurora (CA); Edward Beverly Morrison, King (CA)

(73) Assignee: Geotech Airborne Limited, Lodge Hill (BB)

( * ) Notice: Subject to any disclaimer, the term of this patent is extended or adjusted under 35 U.S.C. 154(b) by 149 days.

This patent is subject to a terminal disclaimer.

(21) Appl. No.: 12/991,792

(22) PCT Filed: May 8, 2009

(86) PCT No.: PCT/CA2009/000607
§ 371 (c)(1),
(2), (4) Date: Nov. 9, 2010

(87) PCT Pub. No.: WO2009/135296
PCT Pub. Date: Nov. 12, 2009

(65) Prior Publication Data
US 2011/0050230 A1    Mar. 3, 2011

Related U.S. Application Data

(63) Continuation-in-part of application No. 12/118,194, filed on May 9, 2008, now Pat. No. 8,030,933.

(51) Int. Cl.
*G01V 3/16* (2006.01)

(52) U.S. Cl. .................................................. 324/330
(58) Field of Classification Search .................. None
See application file for complete search history.

(56) References Cited

U.S. PATENT DOCUMENTS

| | | | |
|---|---|---|---|
| 3,588,962 A | 6/1971 | Feldberg | |
| 3,686,731 A | 8/1972 | Koori et al. | |
| 5,530,358 A | 6/1996 | Wisler et al. | |
| 7,646,201 B2 * | 1/2010 | Miles et al. | 324/330 |
| 8,030,933 B2 * | 10/2011 | Kuzmin et al. | 324/330 |
| 2003/0169045 A1 | 9/2003 | Whitton | |
| 2005/0001622 A1 | 1/2005 | Morrison et al. | |

FOREIGN PATENT DOCUMENTS

CA    2450155 A1    5/2004

OTHER PUBLICATIONS

Inter National Search Report in the corresponding to the International Application No. PCT/CA2009/000607.
AFMAG—Airborne and Ground; S.H. Ward, Geophysics, vol. XXIV, No. 4 (Oct. 1959), pp. 761-789.
US Non-Final Office Action issued on Sep. 10, 2010 and Final Office Action issued on Mar. 7, 2011 corresponding U.S. Appl. No. 12/118,194.

* cited by examiner

*Primary Examiner* — Paresh Patel
(74) *Attorney, Agent, or Firm* — Novak Druce + Quigg LLP

(57) ABSTRACT

A receiver coil apparatus for an electromagnetic survey system, comprising: a tubular outer frame defining an internal passage; a rigid inner member; a receiver coil; a plurality of first elastic suspension members suspending the receiver coil from the rigid inner member within the internal passage; and a plurality of second elastic suspension members suspending the rigid inner member within the internal passage.

18 Claims, 12 Drawing Sheets

DOUBLE-SUSPENSION RECEIVER COIL SYSTEM AND APPARATUS

This application is a continuation-In-Part of prior U.S. patent application Ser. No. 12/118,194 filed May 9, 2008 now U.S. Pat. No. 8,030,933, the contents of which are hereby incorporated herein by reference.

This application is a national stage application of PCT/CA2009/000607, filed May 8, 2009, the contents of which are hereby incorporated herein by reference.

BACKGROUND

Embodiments described herein relate in general to the field of geological mapping, and more particularly to systems for conducting electromagnetic surveys.

Geophysical electromagnetic ("EM") techniques can be effective in determining the electrical conductivity of soils, rocks and other conductive material at depths from the surface of up to about three kilometers. Conductivity distribution at depths is of great interest to those involved in mapping base metals and uranium deposits, aquifers and other geological formations.

Geophysical EM methods can involve measurements of time-varying secondary magnetic fields near the earth's surface. These secondary fields may be produced by way of a primary magnetic field. The source for the primary magnetic field may be current applied to a transmitter (for example in an active EM surveying system), or by naturally occurring electromagnetic fields originating mainly from lightning in the earth's atmosphere (for example in a passive EM surveying system). EM fields can have a characteristic ground penetration depth proportional to the inverse of the square-root of both ground conductivity and frequency.

Traditionally the secondary magnetic field signal can be measured using either a receiver coil system (which for example can be used to measure the magnetic field time derivative dB/dt), or a magnetometer (which measures the magnetic field B). The received analog signal may then be amplified, filtered, and digitized by a high-resolution high-speed analog-to-digital converter (ADC), and the data can be stored along with the positioning information obtained from a Global Positioning System (GPS). Data post-processing may involve electrical and physical modeling of the ground to generate the geophysical conductivity contour maps.

Geophysical surveys may typically require high signal-to-noise ratio (SNR), high conductivity discrimination, and high spatial resolution both laterally and in depth. The EM survey requirements may differ depending on ground conductivity and the desired probing depth.

Some EM systems may use either or both ground-based EM measurements and airborne measurements using airplanes and helicopters. Airborne methods may be preferred for large area surveys and can be used for exploration of conductive ore bodies buried in resistive bedrock, geological mapping, hydrogeology, and environmental monitoring.

For airborne electromagnetic ("AEM") systems, the data may be acquired while the airplane or helicopter flies at a nearly constant speed (for example up to 75 m/s or 30 m/s, respectively) along nearly-parallel and close to equally-spaced lines (for example 5 m to 200 m) at an approximately constant height above ground (for example about 120 m or 30 m, respectively). Measurements can be taken at regular intervals, for example in the range of 1 m up to 100 m.

In active systems having a transmitter coil, EM measurements can be recorded either in the frequency domain or time domain. In frequency-domain electromagnetic ("FDEM") measurements, the transmitter coil continuously may transmit an electromagnetic signal at fixed multiple frequencies, while the receiver coil measures the signal continuously over time. The measured quantities may for example be either signal amplitude and phase as a function of frequency, or equivalently, the in-phase and in-quadrature amplitudes as a function of frequency.

The measured quantities will be affected by the conductivity and geometry of geological bodies in the ground, and can be processed to yield conductivity contour maps. In time-domain electromagnetic ("TDEM") measurements, a pulse of current may be applied to be transmitter coil during an on-period and switched off during an off-period, typically at a repetition rate equal to an odd multiple of half of the local power line frequency. The signal may be measured at the receiver as a function of time. The small amplitude decay during the off-period, combined with modeling of the conductivity and geometry of geological bodies in the ground, can be utilized to yield the conductivity contour maps.

In passive systems that rely on Audio Frequency Magnetic ("AFMAG") measurements, naturally occurring EM fields produced by global lightning discharges maybe used as the excitation source. These EM fields propagate around the earth as plane waves guided by the ionosphere and earth's surface. In AFMAG, the resulting EM signal may be measured by the airborne receiver coil, for example in the frequency range 25 Hz to 2 kHz with data acquisition at 6.25 kHz with 24 bits resolution. In some AFMAG survey systems the measured signal may then be separated into frequency bands such that the crossover frequencies between each band and the next higher band are in the approximate ratio of 1.5:1, and then processed to produce conductivity contour maps. AFMAG may also use measurements of the horizontal magnetic field in real time in order to normalize the measurements done in the aerial survey as the source intensity is constantly varying.

One possible AFMAG setup is to use two orthogonal coils at the ground base station to yield the horizontal component of the magnetic field, and one flying coil to measure the vertical component of the magnetic field. A second vertical coil can also be used at the ground base station to improve the measurement of the reference signal. In some systems, the aerial measurements can be made typically at a distance less than 50 km from the ground base station.

Alternative setups can use three-component measurements at the ground station and/or three component measurements obtained in flight. Multiple base stations can also be used to locate the EM field source and improve the SNR of the measurements.

A receiver coil may measure dB/dt directly. The voltage induced in the receiver coil by a magnetic field B is given by N.A. dB/dt, where the coil sensitivity N.A is the product of the coil number of turns N and the coil area A, and dB/dt is the time-derivative of the magnetic field. The inductance of a coil is proportional to $N^2D$, where N is the number of turns and D is the effective diameter of the coil.

Sources of electrical noise at the receiver coil can include, among other things, the spurious signals produced by the towing aircraft (such as a helicopter) and other metallic parts of the system, lightning activity in the atmosphere, local AC power line interference, VLF radio waves, and thermal noise from the coil and the electronics. A prominent source of noise at the airborne revolver coil may be the microphonic noise produced by the motion of the coil in the magnetic field of the earth. The motion can be produced by wind buffeting the coil, vibration from the aircraft, and rubbing of the coil against the coil suspension system.

U.S. Pat. No. 6,876,202 entitled "System, Method and Computer Product Geological Surveying Utilizing Natural Electromagnetic Fields", issued to Edward Beverly Morrison and Petr Valentinovich Kuzmin, granted 2005 Apr. 5 discloses a receiver coil and suspension means that facilitates a reduction of microphonic noise produced by mechanical vibrations of the receiver coil in the magnetic field of the earth. The method applied by U.S. Pat. No. 6,876,202 is to surround the coil with an acoustic noise absorber. It also discloses a means of reducing noise through permitting distance between the sensors and the aircraft.

U.S. Pat. No. 7,157,914, which includes a description of a geohysical survey system that includes transmitter and receiver coils, discloses a double-suspension receiver suspension apparatus for reducing vibration and microphonic noise.

Increasing signal-to-noise ratio (SNR) at the receiver coil may not be straightforward due to many factors affecting the measurement. In order to minimize the noise produced by various sources in the frequency range of interest, one may need to reduce the movement of the receiver coil relative to the magnetic field of the earth, prevent external mechanical noises from reaching the receiver coil, and minimize the mechanical noises produced by the receiver coil suspension system.

Thus a double-suspension receiver coil that further ameliorates noise in a receiver coil is desired.

SUMMARY OF THE INVENTION

According to one example embodiment, a receiver coil apparatus for an electromagnetic survey system, comprising: a tubular outer frame defining an internal passage, the tubular outer frame being formed from an upper section and a lower section that are releasably secured together such that the upper section can be separated from the lower section to permit access to the internal passage; a rigid inner member; a receiver coil; a plurality of first elastic suspension members suspending the receiver coil from the rigid inner member within the internal passage; and a plurality of second elastic suspension members suspending the rigid inner member within the internal passage.

According to another example embodiment is a receiver coil assembly for a tow assembly of an airborne electromagnetic survey system, comprising: a tubular support frame forming a ring; a rigid inner frame forming a ring and defining a coil channel that is open on one-side thereof, the inner frame being suspended by a set of elastic members within the support frame; and a receiver coil suspended by further set of elastic members from the rigid intermediate member within the coil channel.

According to another example embodiment is a receiver coil assembly for a tow assembly of an airborne electromagnetic survey system, comprising: a tubular support frame defining an internal passage; a plurality of spaced apart tubular frame sections each being suspended by a respective set of elastic members within the internal passage, the tubular frame sections each defining a respective cable passage; and a receiver coil located in the internal passage and passing through the cable passages of the spaced apart tubular frame sections, the receiver coil being suspended within each of the tubular frame sections by a respective further set of elastic members.

According to another example embodiment is an AFMAG receiver coil apparatus for an electromagnetic survey system, comprising: a tubular outer frame defining an internal passage a rigid inner member; a receiver coil for measuring electromagnetic responses to naturally occurring electrical phenomena; a plurality of first elastic suspension members suspending the receiver coil from the rigid inner member within the internal passage; and a plurality of second elastic suspension members suspending the rigid inner member within the internal passage.

In one aspect, the present disclosure relates to a double-suspension receiver coil apparatus comprising: a receiver coil; one or more first suspension members; one or more second suspension members; an inner frame; and an outer frame; wherein the receiver coil is suspended by the first suspension members that connect the receiver coil and the inner frame so as to be positioned at or near the centre of the inner frame and the inner frame is suspended by second suspension members that connect the inner frame and outer frame as to be positioned at or near the centre of the outer frame.

In another aspect, the present disclosure relates to a double suspension receiver coil airborne system comprising a tow assembly for connection to an aircraft, the tow assembly including; a transmitter section; a transmitter frame; and a receiver frame including: an inner frame having a receiver coil therein suspended by one or more first suspension members so as to be positioned at or near the centre of the inner frame; and an outer frame having the inner frame suspended by one or more second suspension members so as to be positioned at or near the centre of the outer frame.

In yet another aspect, the present disclosure relates to a double-suspension receiver coil ground-station system comprising: a receiver frame including: an inner frame having multiple recover coils therein suspended by one or more first suspension members so as to be positioned at or near the centre of the inner frame; and an outer frame having the inner frame suspended by one or more second suspension members so as to be positioned at or near the centre of the outer frame; a mounting support whereby the receiver frame is positioned so that the receiver coils are mounted vertically perpendicular to each other; whereby the receiver coils function to measure a magnetic field in the horizontal plane.

In a further aspect, the present disclosure relates to a method of assembling a double-suspension receiver coil system comprising the steps of suspending a receiver coil within an inner frame the inner frame suspension means including: one or more first suspension members wherein the first suspension members connect to the inner frame and the receiver coil and whereby said connection the receiver coil is suspended close to the centre of the inner frame; suspending the inner frame within an outer frame the outer more suspension means including: one or more inner rings; and one or more second suspension members; wherein the inner rings are secured to the inside wall of the outer frame and the second suspension members connect to the inner rings and the inner frame and whereby said connection the inner frame is suspended close to the centre of the outer frame.

In another aspect, the present disclosure relates to a method of repairing a double-suspension receiver coil system comprising the steps of opening a double-suspension receiver coil system including: an inner frame having an open top-end and a receiver coil therein suspended by one or more first suspension members so as to be positioned at or near the center of the inner frame; and an outer frame formed of first and second sections releaseably attached, having the inner frame suspended by one or more second suspension members so an to be positioned at or near the centre of the outer frame wherein the means whereby the first and second sections of the outer frame are releaseably attached is released to separate the first and second sections allowing access to the second suspension members and inner frame; removing any broken second suspension members or alternatively any broken first suspension members accessible through the open top-end of the inner frame; replacing any broken first or second suspension members; and re-attaching the first and second outer frame members in a releaseably attached manner.

In yet another aspect, the present disclosure relates to a double suspension receiver coil airborne system comprising: a tow assembly for connection to an aircraft, the tow assembly including; a receiver frame including: an inner frame having a receiver coil therein suspended by one or more first suspension members so as to be positioned at or near the centre of the inner frame; and an outer frame having the inner frame suspended by one or more second suspension members so as to be positioned at or near the centre of the outer frame.

In another aspect, the present invention relates to a double suspension receiver coil apparatus comprising: a receiver coil; one or more first suspension members; one or more second suspension members; an inner frame; and an outer frame; wherein the receiver coil is suspended by the one or more first suspension members that connect the receiver coil and the inner frame so as to be positioned at or near the centre of the inner frame and the inner frame is suspended by the one or more second suspension members that connect the inner frame and outer frame so as to be positioned at or near the centre of the outer frame; and wherein the one or more first suspension members and one or more second suspension members are coated with silicone or a similar substance where said suspension members connect to the inner frame, outer frame or receiver coil to reduce the noise produced by rubbing.

Figure 1:
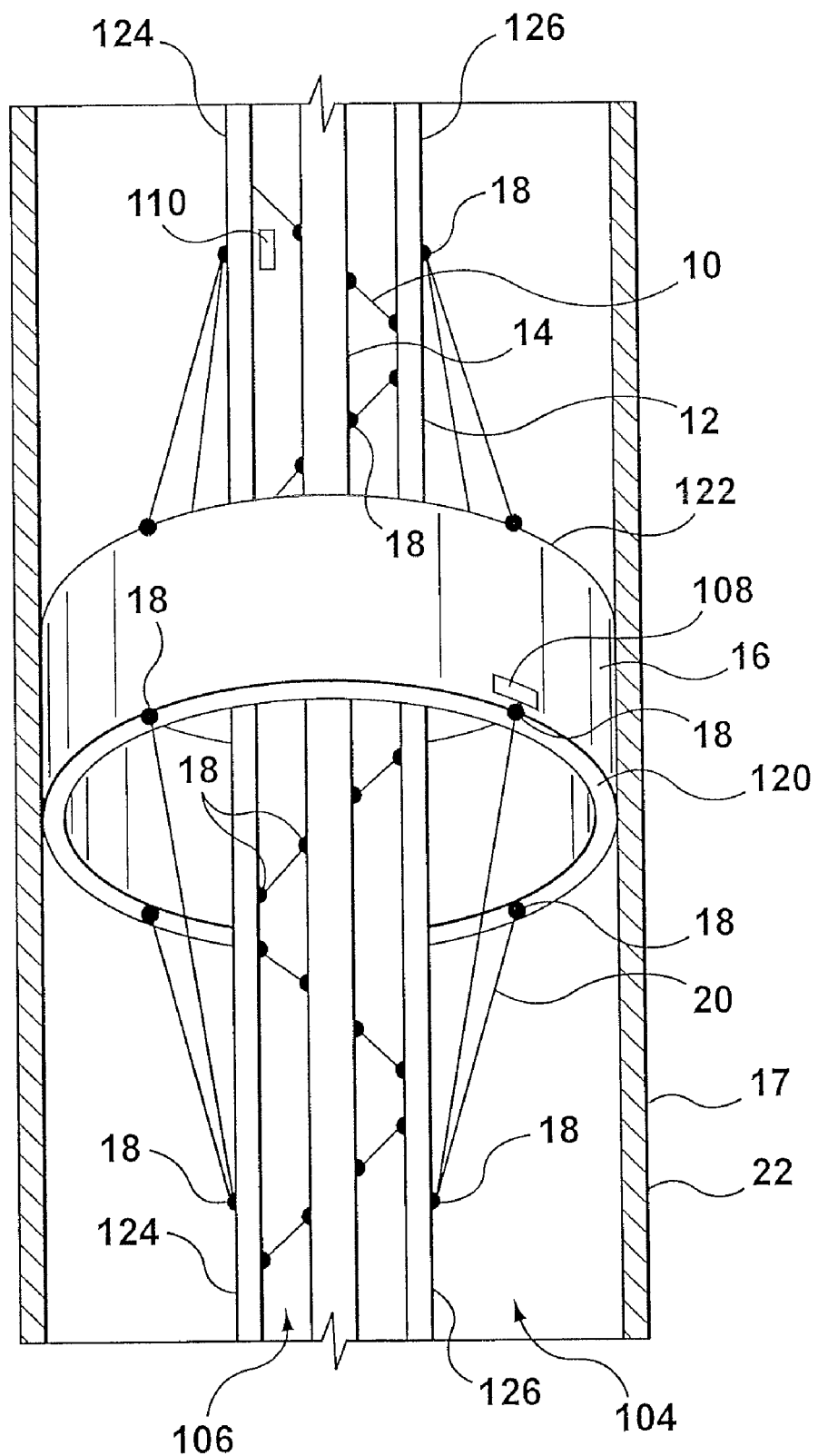
FIG. 1 is a partial sectional view of a receiver coil assembly showing details of a double-suspension system set-up according to an example embodiment, taken along the lines I-I of FIG. 2.

In the drawings and following description, embodiments or the invention are illustrated by way of example. It is to be expressly understood that the description and drawings are only for the purpose of illustration and as an aid to understanding and are not intended as a definition of the limits of the invention.

DETAILED DESCRIPTION

Embodiments of invention relate to a receiver coil double-suspension system directed towards improving the signal-to-noise ratio (SNR) in an geophysical surveying system by reducing microphonic noise. Significant noise may occur in the low frequency portion of the spectrum, and as such at least some example embodiment of the present invention are intended to reduce noise in the low frequency range. Some example embodiments may offer a mechanical isolation system achieving a low cut-off frequency.

In at least some applications, the double-suspension receiver coil system of example embodiments described herein may mitigate microphonic noises and low frequencies noise, and improve the receiver coil SNR by reducing the transmission of system vibrations to the receiver coil.

Figure 5:
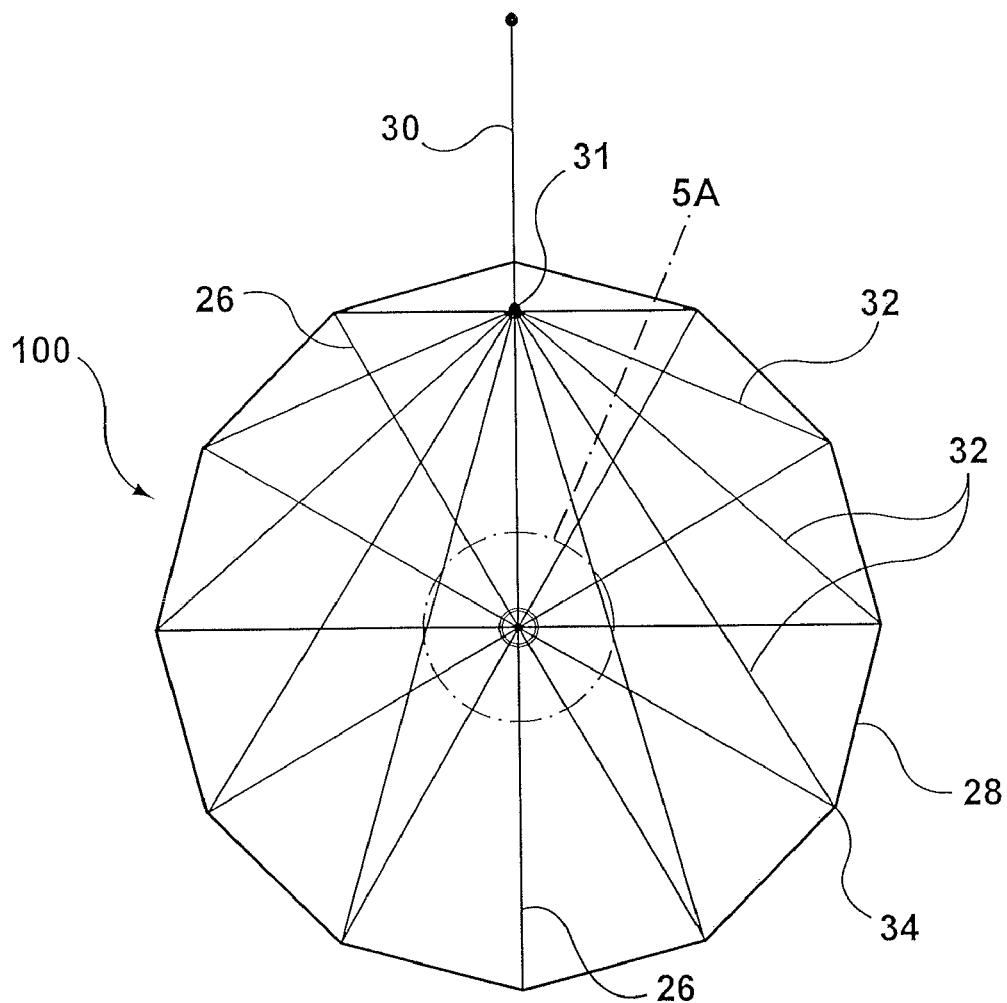
FIG. 5 is a plan view of an airborne tow assembly for geophysical surveying that includes the receiver coil assembly of FIG. 1 placed at the centre of a dodecagonal HTEM transmitter coil frame, according to one example embodiment.
Figure 5A:
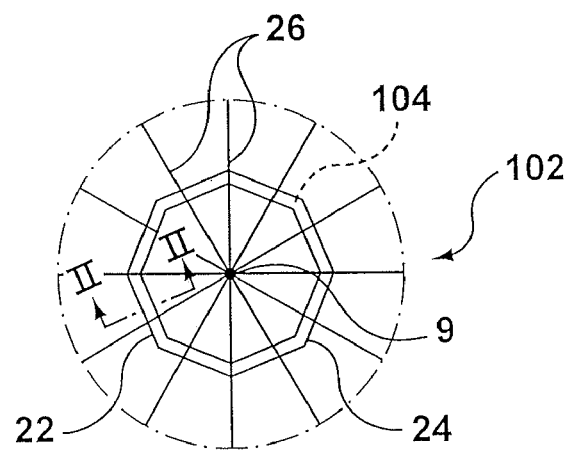
FIG. 5A is an enlarged view of the portion of FIG. 5 referenced by callout 5A, showing the receiver coil assembly in greater detail.
Figure 6:
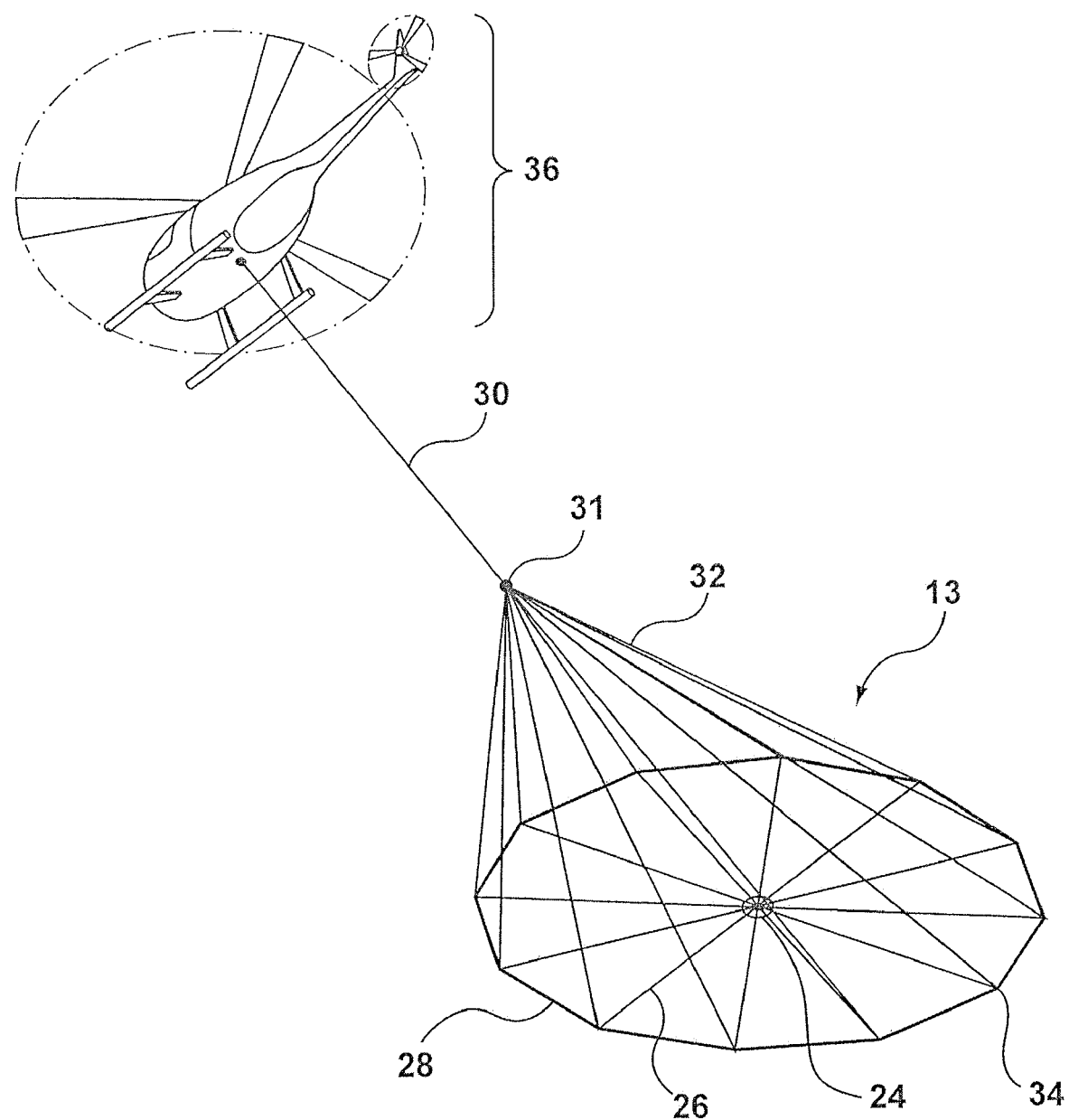
FIG. 6 is a perspective view of the airborne tow assembly of FIG. 5 illustrating its use in a HTEM system towed by a helicopter.

Prior to describing embodiments of the double suspension receiver coil system in detail, an overview will first be provided of an example of an airborne geophysical EM survey system in which such a double suspension receiver coil system could be applied. In this regard, FIGS. 5, 5A and 6 show an airborne tow assembly 100 for airborne electromagnetic surveying according to example embodiments of the invention. The tow assembly 100 includes a transmitter coil frame 28 that is a polygon, such as a dodecagon, built from tubes constructed of glass fiber, Kevlar or other suitable lightweight and durable materials capable of electrical-insulation. The tow assembly 100 also has a receiver coil assembly 102 that includes a polygonal receiver coil frame 24, which may for example be octagonal in shape, that sits at the centre of the transmitter coil frame 28. The two frames may be connected by a radial system of ropes 26. In the illustrated embodiment the ropes 26 extend radially outward under tension from a common central hub 9 to respective locations that are evenly spaced about the perimeter or circumference of the transmitter coil frame 28. The receiver coil frame 24 is attached to and supported by the ropes 26 concentric with the transmitter coil frame 28. U.S. Pat. No. 7,157,914 (the contents of which are incorporated herein by reference) describes one suitable example of how a radial system of ropes can be used to connect a transmitter coil frame and support a receiver coil frame.

Both coil frames 24, 28 may be suspended in a near horizontal position by a suspension system that is attached to the polygonal transmitter coil frame 28. The suspension system that is connected to the transmitter coil support frame 10 includes a tow rope attachment suspension cable 30, which may be attached to an aircraft 36 for the purpose of suspending the transmitter coil frame 28 in an airborne position. A lower end of the tow rope attachment suspension cable 30 is connected at a connection point 31 to a support rope assembly 13 that in turn is connected to multiple pick up points about the circumference of the transmitter coil frame 28.

Figure 8:
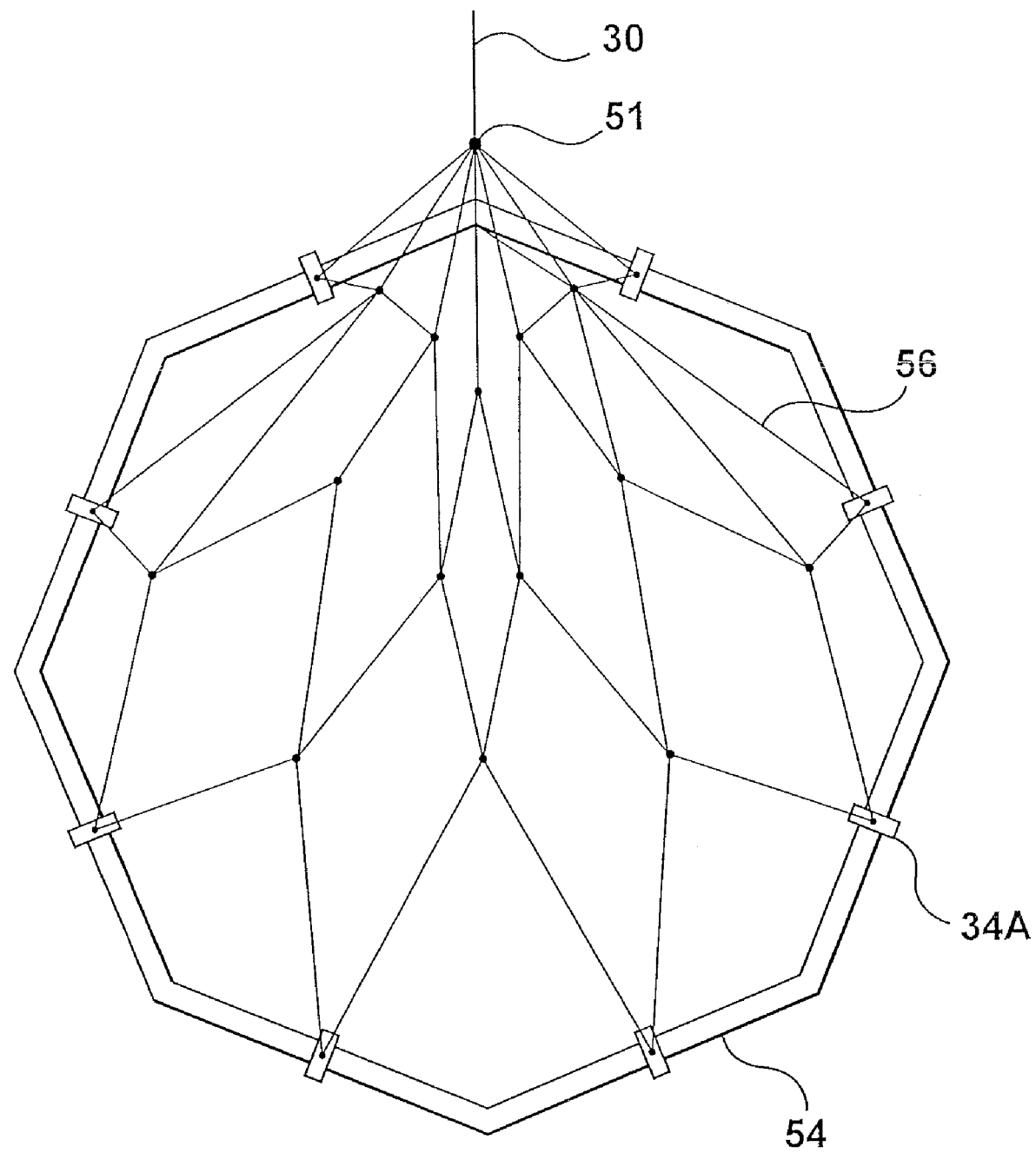
FIG. 8 is a plan view of an AFMAG receiver coil assembly according to an example embodiment.
Figure 9:
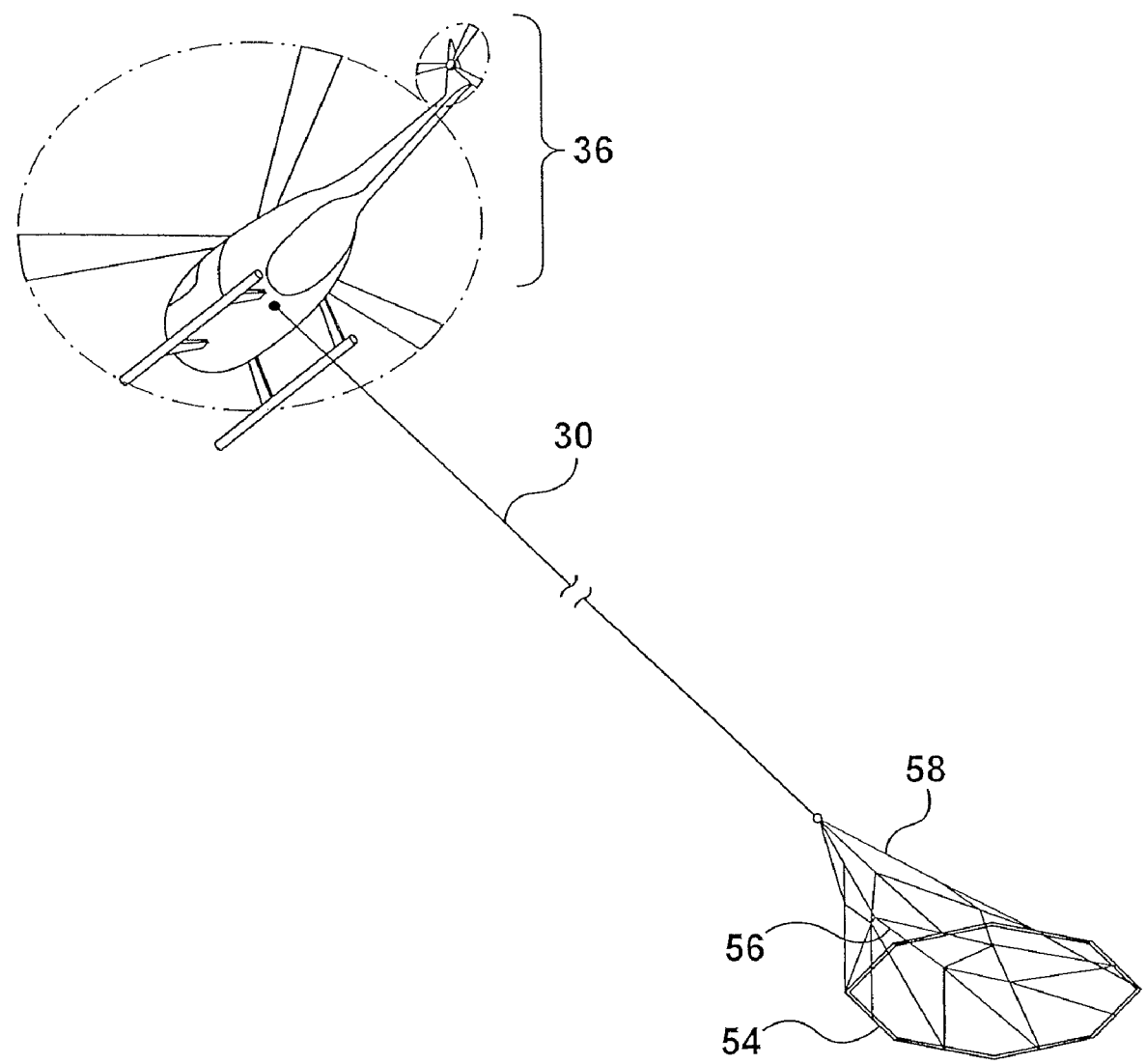
FIG. 9 is a perspective view illustrating the AFMAG receiver coil assembly of FIG. 8 towed by a helicopter.

In the embodiment illustrated in FIGS. 5, 5A and 6, the support rope assembly 13 includes ropes 32 that each have a lower end attached to a respective pick-up point on the circumference of the transmitter coil frame 28 and an upper end attached to the lower end of tow rope attachment suspension cable 30 at connection point 31. In at least some example embodiments, the ropes 32 are each attached to a respective corner 34 of the transmitter coil frame. U.S. Pat. No. 7,157,914 (the contents of which are incorporated herein by reference) describes one suitable example of a support rope assembly 13 that could be used to support the transmitter coil frame 28. In another example embodiment the support rope assembly of suspension system may be constructed of ropes forming a conical mesh or net-like structure such as shown in FIGS. 8 and 9 and described in U.S. patent application Ser. No. 11/610,556 filed on Dec. 14, 2006 and published as US 2008/0143130 (the contents of which are incorporated herein by reference). Other constructions of the suspension system are also possible.

The tow assembly shown in FIGS. 5 and 6 could for example be used in a TDEM electromagnetic survey system in which the receiver coil assembly 102 is used to measure the magnetic field time derivative dB/dt generated from surveyed terrain in response to periodic pulses applied by a transmitter coil supported within the transmitter coil frame 28.

Figure 4A:
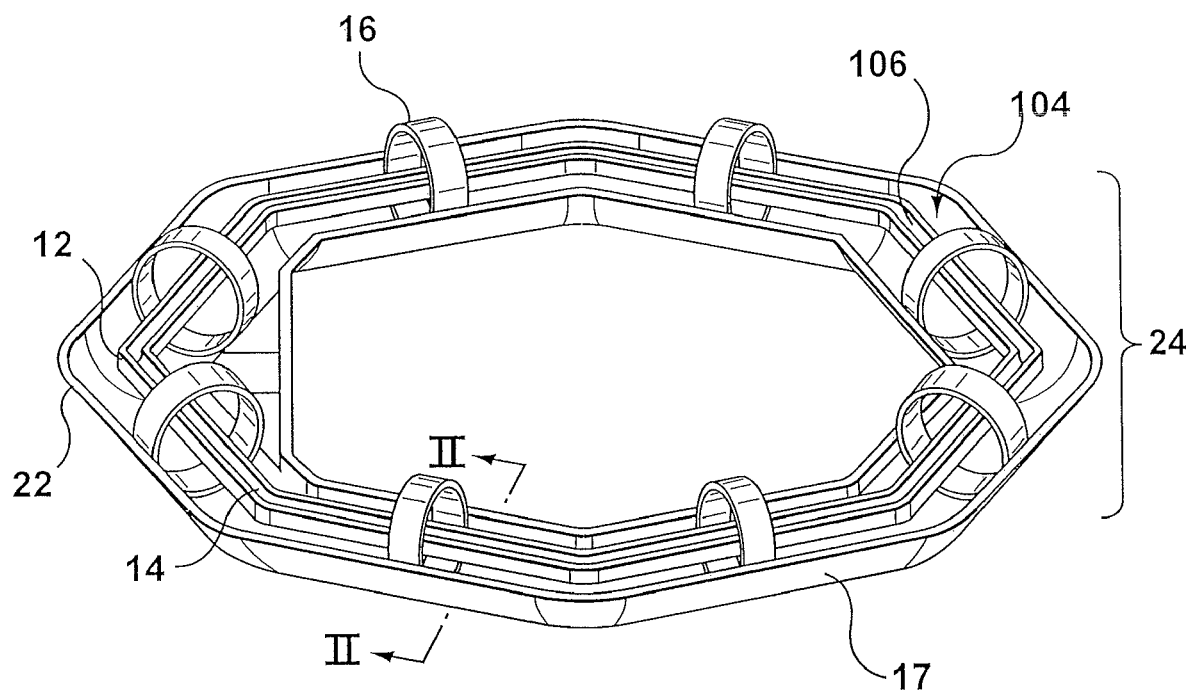
FIG. 4A is a perspective illustration of an interior of the receiver coil assembly, showing an octagonal outer-frame having rings fastened to an internal wall thereof (suspension members are not shown to improve clarity).

In example embodiments, the receiver coil assembly 102 shown in FIG. 5A uses a double suspension receiver coil system as will now be described in greater detail. Referring first to FIG. 5A and the cut-away view of FIG. 4A, in one example embodiment the receiver coil frame 24 includes a rigid tubular outer frame 22 that forming a loop that defines a continuous internal passage 104 in which a conductive receiver coil 14 (see FIGS. 1 and 2A) is suspended. In the illustrated embodiment, the outer frame 22 approximates a circle and is octagonal in shape, however the outer frame 22 can be other shapes in other embodiments, such as other polygonal shapes with more or less than eight sides or circular or elliptical, for example. In example embodiments, the outer frame 22 is formed from a molded fiber-based material that is not electrically conductive but permeable to the magnetic field that is being measured. As shown FIG. 2A, in one example embodiment the outer frame 22 includes upper and lower half-tube sections 19 and 17 that are secured together along cooperating flanges by releasable fasteners 21 such as screws. As shown in FIG. 4A, in one example embodiment, an inner receiver coil frame 12 that defines a loop-like continuous coil channel 106 is suspended within internal passage 104 of the outer frame 22. In example embodiments, the inner receiver coil frame 12 is similar in shape to the outer frame 22—for example, in the illustrated embodiment, the inner frame 12 has an octagonal shape like the outer frame 22 that it is suspended within. In at lease some example embodiments, the receiver coil frame 24 includes a series of spaced apart rings 16 that are located within the passage 104 defined by the outer frame 22. In some embodiments, each ring 16 has an outside surface that substantially conforms to and engages the inner wall of the outer frame 22. In the embodiment shown in FIG. 4A, eight of the rings 16 are provided, one at the approximate centre of each of the eight sides of the outer frame 22, however more of fewer rings 16 could be used depending on the requirements of a particular receiver coil application.

Figure 2A:
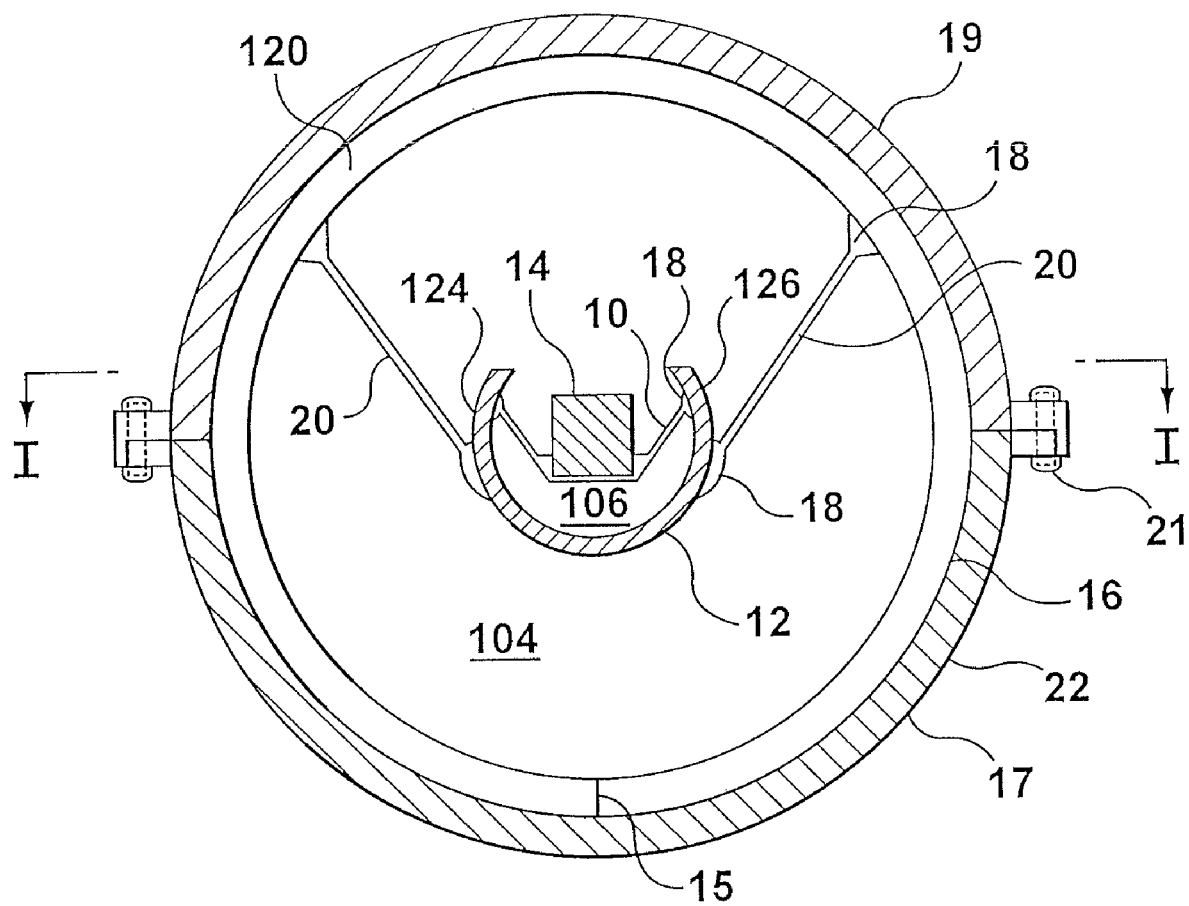
FIG. 2A is a transverse sectional view, taken along the lines II-II of FIG. 5A, of the receiver coil assembly, showing a supporting ring and a receiver coil placed at the centre of an inner frame, supported by suspension members and the inner frame placed at the centre of an outer frame supported by outer suspension members, according to an example embodiment.
Figure 3:
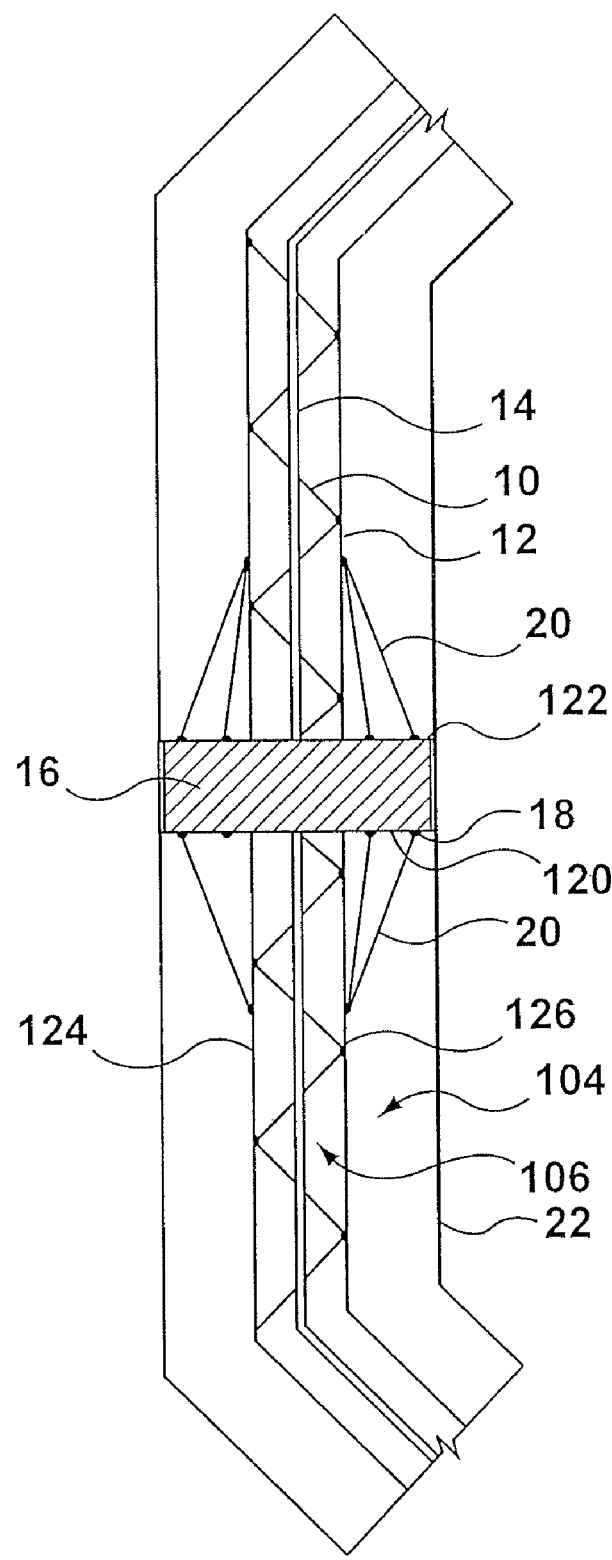
FIG. 3 is a partial sectional top view of the receiver coil assembly, showing the positions of the inner and outer suspension members.

With reference to FIGS. 1, 2A and 3 an example embodiment of a concentric double suspension system used to mount the receiver coil 14 within the internal passage 104 of outer receiver coil frame 22 will now be described. In the illustrated embodiment of the system a set of first suspension members 10, which can for example be formed of an elastic material, such as rubber, although other materials may also be used, may be used to support the receiver coil 14 at the approximate center of the channel 106 defined by the inner frame 12. A set of second of suspension members 20, which can also for example be formed of an elastic material such as a rubber material (although other materials may be used) supports the inner frame 12 such that it is located at or near the center of the outer frame 22. The first and second suspension members 10, 20 may be mounted at an angle close to the transversal direction to maintain the inner frame 12 and the receiver coil 14 in a position concentric to the structure. This arrangement may prevent the receiver coil and the internal frame from moving away from the centered position, as well as from moving along the transversal direction. Mounting at an angle close to the transversal direction may further provide lateral and vertical support which is required for both the inner and outer frames 12, 22. The positioning may cause a damping of vibration vertically and horizontally.

Vibrations transmitted from the towing aircraft, and wind buffeting, affect the outer frame 22. The double suspension receiver coil system is designed to attenuate the amplitude of such vibrations which is transmitted to the receiver coil 14.

In order to attenuate vibration, the suspension must be compliant in all directions so that the outer frame 22 can move or vibrate relative to the receiver coil. In addition, the receiver coil 14 must have sufficient mass so that its inertia will resist forces transmitted through the suspension when the outer frame 22 moves. However, if the mass or the compliance is too great, the suspension will not support the receiver coil against gravity or maneuvering loads. At a minimum, the suspension must prevent the receiver coil from touching the outer frame under typical loads. This limits the attenuation that can be achieved with a single stage suspension.

In a two stage suspension, the receiver coil is suspended within an inner frame 12. The inner frame is then suspended within the outer frame 22 by suspension members 20. The mass of the inner frame, with the compliance of the suspension members 20, attenuates vibrations of the outer frame which are transmitted to the inner frame. These vibrations are further attenuated as a result of the compliance of inner suspension members 10 and mass of the receiver coil 14 and components attached to it. In determining the overall behaviour of the receiver coil 14 relative to the outer frame 22, the attenuations of the two suspensions are approximately multiplicative, while the deflections under load of the two suspensions are approximately additive. As a result, the double suspension can achieve substantially greater overall attenuation than could be achieved with a single suspension.

In one embodiment of the invention, as shown in FIG. 1, the first suspension members 10 may be connected to the receiver coil 14 and the inside wall of the inner frame 12 by conventional plastic cable ties 18. The second suspension members may be connected to outside wall of the inner frame 12 and either the inside end of the outer frame, or inner rings 16 by cable ties 18. Both ends of a suspension member 10, 20 may be connected to a cable tie. This double suspension system may have the effect of reducing noise at the receiver coil which would otherwise arise from the outer frame 22 as well as noise produced by the rubbing of the suspension. Embodiments of the double-suspension configuration can be effective in lowering the low-pass cut-off frequency of the system thus lowering the microphonic noise at the receiver coil 14. In a example embodiment the cable ties 18 may be covered with silicone or a similar material to prevent the coil 14 and the inner frame 12 from rubbing against their suspension members and thus eliminating the noise produced by such rubbing.

In example embodiments, the second suspension members 20 may be mounted on inner rings 16 close to the transverse position, but may also have a vertical component thereto. The second suspension members 20 may have one end attached radially onto the inner rings 16, while the other end may be laterally displaced and attached to the inner frame 12. This structure may be affected for both sides of the inner ring 16 to keep the inner frame 12 in place.

In some example embodiments it is possible to use both transverse and vertical suspension to accomplish the same result for each of the first and second suspension members.

In example embodiments the inner ring 16 and the inner frame 12 may have pre-drilled holes 108, 110, respectively, or other openings formed through them. The cable ties 18 can be fit through the holes 108, 110 and through loops in the first and second suspension members 10, 20 and then may be tied together. Silicone can be applied on the attachment points to prevent any squeaking noise caused by rubbing of the parts. Any number of other possible methods can be used to attach the first and second suspension members 10, 20 including for example: hooks, or a machined hook-like attachment point connected to the attachment points whereby the suspension members may be looped around the hooks and then covered by silicone. Alternatively, loops on the first and second suspension members can be screwed into the attachment points, in a manner similar to the attachment of plugs and sockets of electrical fixtures. Another possibility is to glue the first and second suspension members 10, 20 to the inner frame 12, and to the outer frame 22 or inner rings 16. In all possible means of attaching the first and second suspension members to the inner frame or to the outer frame or inner rings, the attachment may be firm and may be coated with silicone, or any equivalent substance to reduce squeaking.

As shown in FIGS. 1 and 2A, the receiver coil 14 may be placed at the approximate center of the inner frame 12, and be supported in this position by first suspension members 10 attached to the inside wall of the inner frame 12. The inner frame 12, positioned at the center of the outer frame 22, may be supported in this location by second suspension members 20 attached to the inner rings 16. In at least some example embodiments, the inner rings 16 may have cuts 15 therein, for example positioned at a bottom thereof, to allow for assembly. In one embodiment of the invention, the supporting ring 16 may not be a full circle, to facilitate assembly of the receiver coil double suspension system.

As shown in FIGS. 1 and 2A, in example embodiments the inner frame 12 may have a C-shaped or U-shaped cross-sectional profile with an open top-end offering access to channel 106 such that the receiver coil 14 is not fully enclosed by the inner frame 12. An open top-end inner frame 12 may facilitate assembly of the receiver coil 14 within the inner frame 12.

It will that be appreciated from the above description and the Figures discussed above that the receiver coil double suspension system according to example embodiments includes a receiver coil 14 that is suspended by first elastic suspension members 10 within a channel 106 of a rigid inner frame 12. The rigid inner frame 12 in turn is suspended by a second set of suspension members 20 within the internal passage 104 of tubular outer frame 22. In the illustrated embodiment, inner mounting rings 16 are used as an interface for securing the outer ends of the second suspension members 20 to an inner wall of the outer frame 22. As best seen in FIGS. 1, 2A, and 3, in an example embodiment each straight section of the outer fame 22 includes a centrally located inner support ring 16. A plurality of suspension members 20 extend from a first end 120 of the ring 16 to opposite longitudinal sides 124, 126 of the inner frame 12, and a plurality of second suspension members 20 also extend from the other, or second, end 122 of the ring 16 to locations on opposite sides 124, 126 of the inner frame 12. The outer ends of the second suspension members 20 that are connected to the first and second ends 120, 122 of the inner ring 16 can be circumferentially spaced about the respective ends 120, 122. The circumferential spacing allows opposing radial tension forces to be applied on the inner fame 12 by the different suspension members 20.

It will further be appreciated from the Figures that the connection point of each suspension member 20 at the outer ring is axially displaced from the connection point of the other end of the suspension member 20 at the inner frame such that the suspension member extends diagonally and does not extend the shortest radial distance between the inner frame 12 and the outer frame 22. Further, the suspension members 20 extend in opposite axial directions from the opposite ends of the 120, 122 of the inner ring 16 such that the suspension members 20 that extend from the first end 120 of the ring 16 provide an axial tensioning force on the inner frame 12 that is opposed to the axial tensioning force provided on the inner frame 12 by the suspension members 20 that extend from the opposite end 122 of the ring 16.

Thus, in at least one example embodiment, the second suspension members 20 are arranged to apply balanced axially (or transverse) opposed forces to the inner frame 12 as well as balanced radially opposed forces to the inner frame 12 to dampen both axial and radial movement of the frame 12 within the internal passage 104.

As seen in FIGS. 2A and 3, in one example embodiment, each first elastic suspension member 10 is diagonally arranged such that its connection point to the inner fame 12 is axially displaced relative to its contact point to the receiver coil 14, with the direction of axial displacement alternating between adjacent first suspension members 10 such that the elastic suspension members 10 that the net effect of the first suspension members is to provide balanced opposing axial forces on the receiver coil 14 as well as balanced opposing radial forces.

It will be appreciated that the arrangement of first and second suspension members can be selected in dependence on the desired orientation of the receiver coil frame assembly in order to account for gravitational forces.

In some example embodiments, rings 16 may be omitted and the outer ends of the second suspension members 20 secured directly to the wall of the outer frame 22.

Figure 2B:
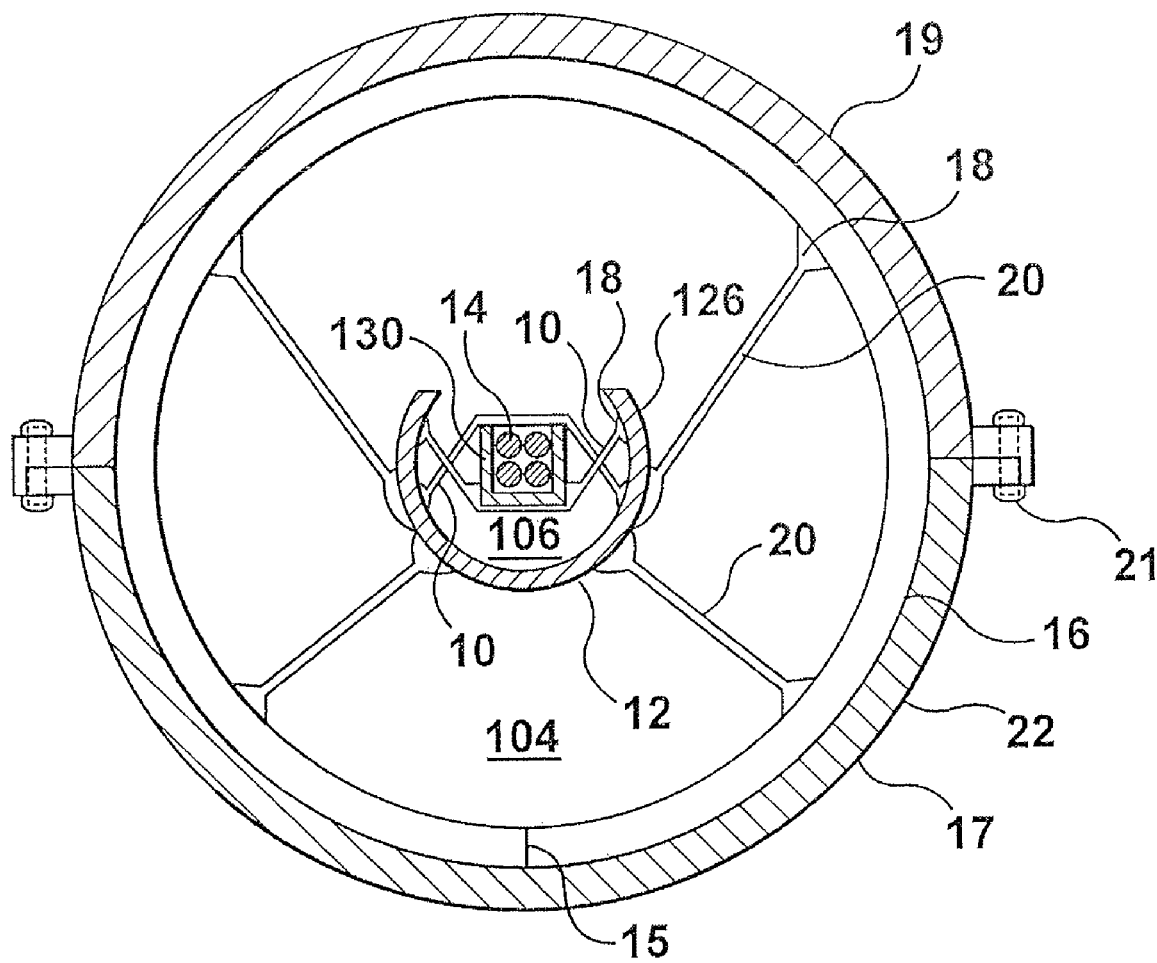
FIG. 2B is a view similar to FIG. 2A, showing a variation of the receiver coil assembly.
Figure 4B:
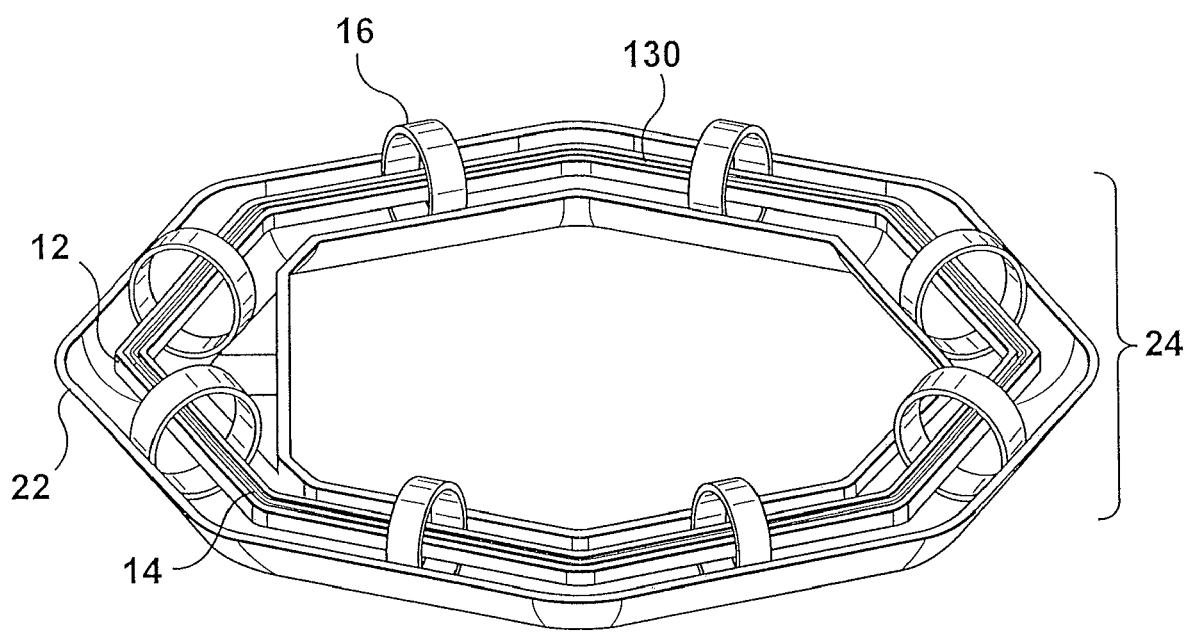
FIG. 4B is a view similar to FIG. 4A, showing a variation of the receiver coil assembly.

In some example embodiments, the receiver coil 14 includes a coil frame or channel member that is secured by first suspension members 10. In this regard, FIGS. 2B and 4B show a multi-turn receiver coil 14 that includes an electrical conductor secured within a channel member 130 that is suspended by first suspension members 10 within the channel 106 defined by the inner frame 12. In example embodiments, the channel member 130 is secured by first suspension members 10 in the same manner discussed above. The channel member 130 may have the same overall shape as the inner frame 12, but with a smaller cross-sectional area—for example the channel member 130 may have a U-shaped cross-section area and be shaped to provide an octagonal channel for receiving the conductive cable that forms the receiver coil 14. The channel member 130 can be used to facilitate winding of the receiver coil 14 and can also provide further rigidity to the receiver coil, and in this respect can function as a coil former.

As shown in FIG. 2B, in some example embodiments, some first suspension members 10 can be arranged to pass over a top side of the receiver coil 14, and some of the first suspension members 10 can be arranged to pass under the receiver coil 14 to apply balanced vertically opposing forces against the receiver coil 14.

As shown in FIG. 3 and FIG. 4A, in the HTEM receiver coil embodiment, the double-suspension system may be mounted inside an outer frame 22 structure constructed of molded fiberglass, although other materials may also be utilized.

By way of non limiting example, the receiver coil assembly 102 may be polygonal, for example octagonal, and have an overall size of approximately 1.2 m, the outer frame 22 may be shaped so as to have an approximately 150 mm circular cross-section and include walls of approximately 6 mm thickness, and the inner frame 12 may be shaped to have an approximately 50 mm cross-section and include walls of approximately 3 mm thickness. The receiver coil may be positioned at or close-to the centre of the inner frame by way of the multi-point double-suspension system. The inner fame 12 may be positioned at the center of the outer frame 22 by another multi-point suspension system. The receiver coil and inner frame positioning multi-point suspension systems may be constructed of first and second suspension members 10 and 20 formed from elastic material, such as rubber, secured by way of cable ties 18 that maybe silicone-covered.

The above-described embodiments may for example function as a HTEM receiver coil double-suspension system. In the illustrated embodiment the second suspension members 20 may keep the inner frame 12 positioned at the center or close to the centre, of the outer frame 22, and the receiver coil 14 may be positioned at the center or near the centre of the inner frame 12 and held in this position by first suspension members 10. The first and second suspension members 10 and 20 may be placed in alternating diagonal positions in order to maintain tension along the transversal direction.

As noted above, FIG. 4A and FIG. 2A show an embodiment of the present invention wherein the outer frame may be constructed as two sections 17 and 19. In one embodiment the two-piece section may be shaped as a two-piece shape. The two sections 17 and 19 may be constructed of molded glass fiber, or any other appropriate material. As shown in FIG. 2A the sections may be held together by screws 21. The combination of the inner frame 12 having an open top-end, the sectional structure of the outer frame, and the screw mechanism for releaseably attaching the outer frame sections, may allow for easy access to the receiver coil for the purposes of assembly, mounting testing and repair, including repair in the field.

In one embodiment of the invention the suspension members 10, 20 may be replaced and covered by silicone should they break in the field. Inner rings 16 may also be replaced in the field and the outer frame 22 can either have a broken section replaced, or can be mended through the use of materials, such as fiberglass, in the field.

In one embodiment wherein the outer frame 22 is constructed of two sections 17 and 19, the second suspension members 20 may connect to the inner rings 16. This structure allows the two sections 17 and 19 to be separable without affecting the suspension of the receiver coil.

As shown in FIGS. 4A and 4B, embodiments of the invention may include multiple inner rings 16. In one embodiment of the present invention inner rings 16 may be fastened to the internal wall of the outer frame 22, at approximately the mid-point of each side of the outer frame.

Thus, in some example embodiments, the first suspension members 10 and the inner frame 12 provide a first suspension assembly, and the second suspension members 20 and the rings 16 provide a second suspension assembly.

FIG. 5 shows an embodiment of the receiver coil frame 24 as it may be utilized in conjunction with an HTEM transmitter coil frame. In this embodiment, the HTEM receiver coil frame 24 may he positional at the centre of the transmitter coil frame 28.

In one embodiment of the invention the transmitter coil frame 28 may be a dodecagonal shape and approximately 26 m in diameter. In one embodiment of the invention the receiver coil frame 24 and the transmitter coil frame 28 may be connected by a system of radial cables 26. The receiver coil frame 24 and transmitter coil frame 28 may be suspended by an external suspension system 32 attached to the corners 34 of the receiver coil frame 24 and transmitter coil frame 28. Both coil suspensions systems may be attached to a cable 30 which may be towed by an aircraft, such as a helicopter.

FIG. 6 shows an embodiment of the present invention in use as a HTEM receiver coil frame 24 in conjunction with a transmitter coil 28 wherein the combination of coils may be in flight being towed by a helicopter 36 flying at a speed capable of suspending the coils in a near-horizontal position.

In one embodiment of the present invention, the HTEM transmitter coil frame 28 and receiver coil frames 24 may in flight progress at an appropriate surveying speed, for example an approximate speed of 30 m/s, or any other surveying speed that is capable of suspending the coils in a near-horizontal position.

In some embodiments, the transmitter coil frame 28 may be supported by the external suspension system 32 from a point 31 vertically and horizontally displaced away from the centre of the coil frames, for example approximately 20 m away from the centre of the coil frames, and this suspension point 31 may be attached to the helicopter 36 by a long cable 30, for example a cable approximately 21 m long. In this embodiment, the receiver coil frame may be suspended by multiple cables of varying lengths converging at a point distant from the centre of the receiver coil frame and even more distant from the helicopter, for example a point located approximately 1 m away from the center of the receiver coil frame 24, and approximately 40 m away from the helicopter 36.

As shown in FIG. 6, in one embodiment of the invention, while in flight the transmitter and receiver coils may be suspended in a near-horizontal or horizontal position, with the towing cable 30 at an angle from the vertical, for example an angle of approximately 35 degrees from the vertical. The suspension structure may maintain the horizontal positions of the coils during flight due to a combination of the drag produced by the wind, the weight of the structure and the suspension structure.

Figure 7:
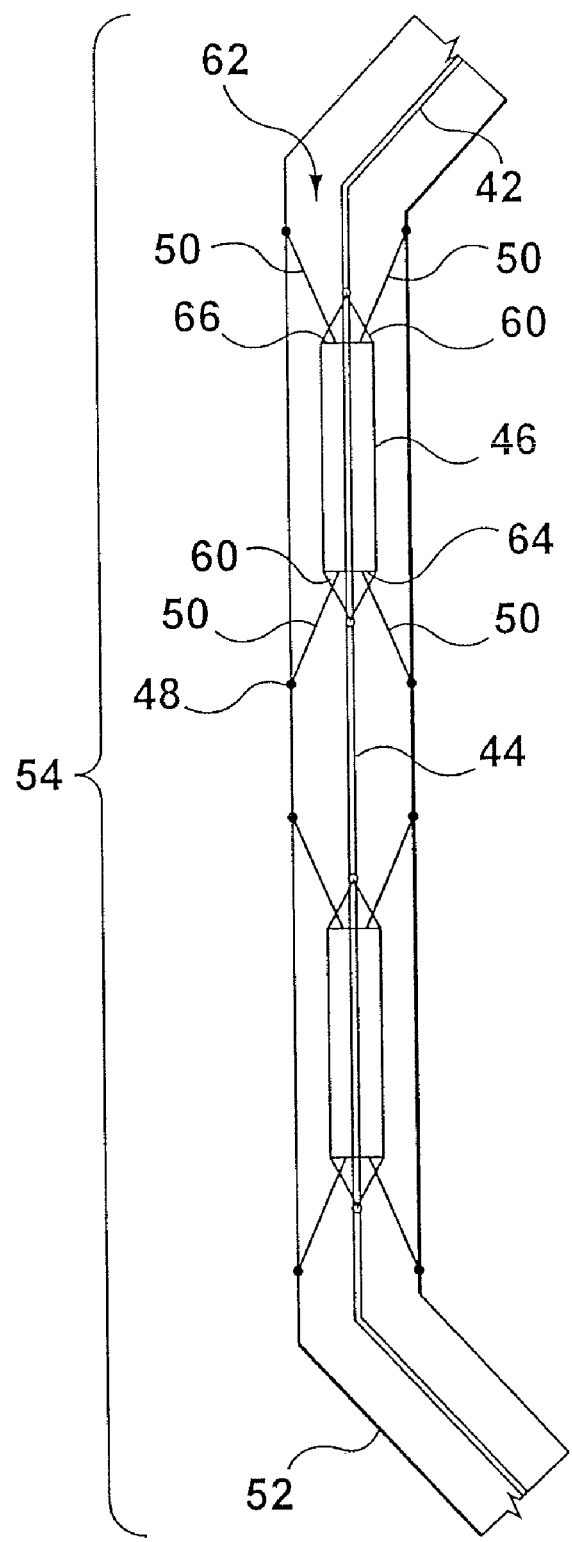
FIG. 7 is a partial sectional top view of a receiver coil assembly according to another example embodiment, showing a further possible configuration of a receiver coil double suspension system.

FIGS. 7, 8 and 9 show another example embodiment of receiver coil double suspension system. The system shown in FIGS. 7, 8 and 9 may for example be used as an AFMAG Receiver Coil double-suspension system in tow assembly for an AFMAG system that does not have a transmitter coil. For example, receiver coil configuration shown in FIGS. 7, 8 and 9 could be used in a natural electromagnetic based geophysical surveying system similar to that disclosed in U.S. Pat. No. 6,876,202, the contents of which are incorporated herein by reference. In this embodiment, the AFMAG receiver coil frame 54 may be an octagon formed of non-conductive material having, by way of non-limiting example, an overall size of approximately 8 m. In this embodiment there may be no inner rings 16, and the inner frame may be non-continuous, and by way of example the inner frame may be composed of tubular sections 46 along each side of the octagon to a total of 16 sections.

In the double suspension system shown in FIGS. 7, 8 and 9, the receiver coil frame 54 includes a tubular outer fame 52 that forms a loop defining an internal coil passage way 62 in which a receiver coil 42 is suspended using a double suspension system. In the illustrated embodiment, the outer frame 52 approximates a circle and is octagonal in shape, however the outer frame 52 can be other shapes in other embodiments, such as other polygonal shapes with more or less than eight sides or circular or elliptical, for example. In example embodiments, the outer frame 52 is similar in construction to frame 22 described above and is formed from a molded fiber-based material that is not electrically conductive but permeable to the magnetic field that is being measured. As with frame 22, the frame 52 may include upper and lower half-tube sections that are secured together along cooperating flanges by releasable fasteners such as screws.

Inside the coil passage 62 the receiver coil 42 passes through a plurality of spaced apart inner tubular sections 46, each of which is suspended in the coil passage 62 by second elastic suspension members 50 from the outer frame 52. The tubular sections 46 each have a smaller diameter than the inner diameter of the sections of the outer frame 52. As shown in FIG. 7, a first set of second suspension members 50 extend from circumferentially spaced locations at one end 64 of the tubular section 46 to respective attachment points on the inner wall of the frame 52, and a second set of second suspension members 50 extend from circumferentially spaced locations at the opposite end 66 of the tubular section 46 to respective attachment points on the inner wall of the frame 52. The suspension members 50 that extend from the first end 64 of the tubular section 46 are diagonally arranged so that they each attached to a respective location on the outer frame 52 that is axially spaced from the first end 64 of the tubular section 46, and the suspension members 50 that extend from the second end 66 of the tubular section 46 are diagonally arranged so that they each attached to a respective location on the outer frame 52 that is axially spaced from the second end 66 of the tubular section 46. Such an arrangement places the tubular section 46 under balanced axially opposed tension forces as well as balanced radially opposed tension forces to bias the tubular section into the center of the internal coil passage 62.

The receiver coil 42 is in turn centrally suspended within each tubular section 46 by a plurality of first elastic suspension members 60. As shown in FIG. 7, a first set of first suspension members 60 extend from circumferentially spaced locations at one end 64 of the tubular section 46 to respective contact points on the receiver coil 42, and a second set of first suspension members 60 extend from circumferentially spaced locations at the opposite end 66 of the tubular section 46 to respective contact points on the receiver coil 42. The suspension members 60 that extend from the first end 64 of the tubular section 46 are diagonally arranged so that they each attached to a respective location on the receiver coil 42 that is axially spaced from the first end 64 of the tubular section 46, and the suspension members 60 that extend from the second end 66 of the tubular section 46 are diagonally arranged so that they each attached to a respective location on the receiver coil 42 that is axially spaced from the second end 66 of the tubular section 46. Such an arrangement places the receiver coil 42 under balanced axially opposed tension forces as well as balanced radially opposed tension forces to bias the tubular section into the center of the tubular section 46.

The receiver coil 42 may include a coil channel member 130 such as described above in respect of receiver coil 14. The first and second elastic suspension members can be secured in place using cable ties 18 in the same manner described above.

In one embodiment the receiver coil frame 54 may be separated into pieces for ease of transportation. In another embodiment the receiver coil frame 54 may be separated into a number of pieces equal to the number of sides of the frame, such as eight pieces for an octagonal-shaped frame.

In one example embodiment the tubular members of outer frame 52 have a circular cross-section, for example an approximate 300 mm circular cross-section, that has walls for example of an approximately 5 mm thickness. The tubular sections 46 that form the equivalent of a segmented inner frame may be shaped to be smaller than the outer frame, for example to have an approximate 150 mm cross-section and to have walls of an approximate 5 mm thickness.

In one embodiment the double-suspension system and multi-point suspension system of frame 54, may be comprised of first and second suspension members and cable ties 48, the first and second suspension members being positioned to diagonally alternate to maintain tension along the transversal direction.

As shown in FIG. 8, the AFMAG receiver coil tow assembly system may be supported by a net-like suspension mesh 56 attached to attachment points 34A about the circumference of the frame 54. In one embodiment of the invention the receiver coil frame 54 may have an overall size that may measure, for example approximately 8.0 m in diameter. The receiver coil frame 54 may be suspended by cables of varying lengths to a point 51 of connection to a tow rope 30 located, for example approximately 9 m away from the center of the receiver coil frame 54.

FIG. 9 shows the AFMAG receiver coil frame wherein the receiver coil is in flight towed by a helicopter 36 that may be flying at a constant speed to maintain the coil in a horizontal or near horizontal position. In this embodiment the receiver coil frame 54 may be supported by the suspension mesh 56 from a point that is approximately 9 m away from the centre of the receiver coil frame 54, this suspension point further being suspended from the helicopter 36 by a cable 30 that may measure, for example approximately 90 m long.

In this embodiment the length of each suspension cable 58 may vary such that during flight the receiver coil frame 54 is maintained in a horizontal position or near-horizontal position. The towing cable 30 may be at an angle from the vertical during flight, for example approximately 35 degrees from the vertical, to support the near-horizontal positioning of the receiver coil frame 54. The receiver coil system may maintain the horizontal or near-horizontal position during flight due to a combination of the drag produced by the wind, the weight of the structure and the meshes.

Figure 10:
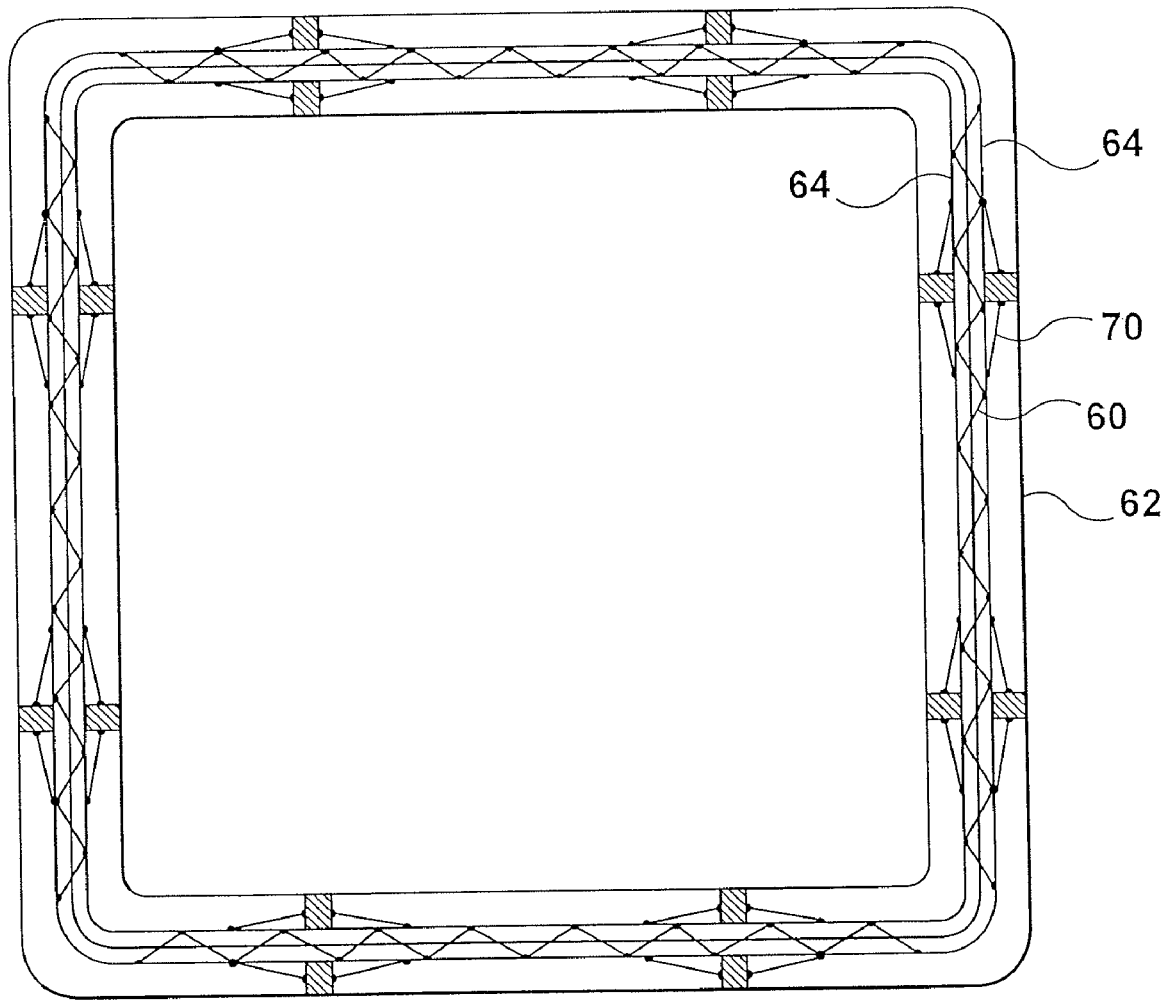
FIG. 10 is a sectional side view of an AFMAG ground-based square receiver coil according to an example embodiment of the invention.

FIG. 10 shows a further embodiment that is similar to the double suspension system described above in respect of FIGS. 1-4B, and which may be used for example as a double-suspension AFMAG ground-station receiver coil. Ground-station coils may typically be mounted in pairs in a vertical position, with the two coils orthogonal to each other, in such way that is possible to measure the magnetic field vector in the horizontal plane. Whenever a third coil is necessary to measure the vertical component of the magnetic field, it maybe placed on the ground.

Tow frames such as shown in FIG. 10 may be mounted vertically perpendicular to each other to measure the magnetic field in the horizontal plane. In this embodiment, each receiver coil may be supported by a double-suspension system with suspension members 60 and 70 that may be constructed of an elastic material, such as rubber, or any other material having requisite tensile strength to accommodate the weight of the receiver coils and the inner frame 64.

It will be appreciated that the double suspension system described above in respect of the TDEM system of FIGS. 5 and 6 and shown in FIGS. 1 to 4B could also be applied in the AFMAG receiver coil frame shown in FIGS. 8 and 9, and similarly the double suspension system described in respect of the AFMAG tow assembly of FIGS. 8 and 9 as shown in FIG. 7 could also be applied to the TDEM system of FIGS. 5 and 6.

It will be appreciated by those skilled in the art that other variations of the embodiments described herein may also be practiced without departing from the scope of the invention. Other modifications are therefore possible.

What is claimed is:

1. A receiver coil apparatus for an electromagnetic survey system, comprising:
    a tubular outer frame defining an internal passage, the tubular outer frame being formed from an upper section and a lower section that are releasably secured together such that the upper section can be separated from the lower section to permit access to the internal passage;
    a rigid inner member;
    a receiver coil;
    a plurality of first elastic suspension members suspending the receiver coil from the rigid inner member within the internal passage; and
    a plurality of second elastic suspension members suspending the rigid inner member within the internal passage.

2. The apparatus of claim 1 comprising an inner ring secured in the internal passage and through which the rigid inner member passes, the second suspension members suspending the rigid inner member from the inner ring.

3. The apparatus of claim 2 wherein the inner ring engages an inner wall of the tubular outer frame and the inner ring includes a cut through a portion thereof that can be expanded to allow a portion of the receiver coil and the rigid inner member to pass therethrough.

4. The apparatus of claim 1 wherein the second suspension members are each secured to an inner wall of the outer frame and suspend the rigid inner member from the inner ring.

5. The apparatus of claim 1 wherein the tubular outer frame forms a loop such that the internal passage is a continuous passage for the receiver coil.

6. The apparatus of claim 5 wherein the rigid inner member is an inner frame that defines a continuous coil channel in which the first elastic members suspend the receiver coil.

7. The apparatus of claim 6 wherein the inner frame allows access to the receiver coil from a top-side thereof.

8. The apparatus of claim 1 wherein the rigid inner member is a tubular section that defines an internal tubular passage through which the receiver coil passes.

9. The apparatus of claim 8, comprising a plurality of the tubular sections, each tubular section having a respective set of first suspension members suspending a respective portion of the receiver coil and a respective set of second suspension members suspending the tubular section from the tubular outer frame.

10. The apparatus of claim 1 wherein the receiver coil includes an electrical conductor secured within a channel member.

11. The apparatus of claim 1 wherein at least some of the first suspension members are connected at non-right angles to the receiver coil in opposing tension to each other to dampen both radial and axial movement of the receiver coil within the internal passage.

12. The apparatus of claim 1 wherein at least some of the second suspension members are connected at non-right angles to the inner member and in opposing tension to each other to dampen both radial and axial movement of the inner member within the internal passage.

13. The apparatus of claim 1 wherein the outer frame forms a polygonal or circular loop.

14. The apparatus of claim 1 wherein the receiver coil is configured for measuring AFMAG signals.

15. The apparatus of claim 1 in combination with a transmitter coil for generating a primary field, the receiver coil being configured for measuring a secondary field generated by surveyed terrain in response to the primary field, the transmitter coil and receiver coil apparatus being part of an airborne geophysical survey system.

16. A receiver coil assembly for a tow assembly of an airborne electromagnetic survey system, comprising:
    a tubular support frame forming a ring;
    a rigid inner frame forming a ring and defining a coil channel that is open on one-side thereof for substantially an entire circumference of the ring, the inner frame being suspended by a set of elastic members within the support frame; and
    a receiver coil suspended by further set of elastic members from the rigid intermediate member within the coil channel.

17. A receiver coil assembly for a tow assembly of an airborne electromagnetic survey system, comprising:
    a tubular support frame defining an internal passage;
    a plurality of spaced apart tubular frame sections each being suspended by a respective set of elastic members within the internal passage, the tubular frame sections each defining a respective cable passage; and
    a receiver coil located in the internal passage and passing through the cable passages of the spaced apart tubular frame sections, the receiver coil being suspended within each of the tubular frame sections by a respective further set of elastic members.

18. An AFMAG receiver coil apparatus for an electromagnetic survey system, comprising:
    a tubular outer frame defining an internal passage a rigid inner member;
    a receiver coil for measuring electromagnetic responses to naturally occurring electrical phenomena;
    a plurality of first elastic suspension members suspending the receiver coil from the rigid inner member within the internal passage; and
    a plurality of second elastic suspension members suspending the rigid inner member within the internal passage.

* * * * *